United States Patent [19]

Klein et al.

[11] 4,110,002

[45] Aug. 29, 1978

[54] OPTICAL FIBERS FORMED OF ALUMINUM BOROPHOSPHATE GLASS COMPOSITIONS

[75] Inventors: Richard M. Klein, Framingham; Carr Lane W. Quackenbush, Lexington; Andrew G. Kolbeck, Beverly, all of Mass.

[73] Assignee: GTE Laboratories Incorporated, Waltham, Mass.

[21] Appl. No.: 773,527

[22] Filed: Mar. 2, 1977

[51] Int. Cl.$^2$ .................. C03C 13/00; C03C 25/02
[52] U.S. Cl. ............................ 350/96.29; 106/47 R; 106/50; 350/96.34; 428/366; 428/392
[58] Field of Search ............ 428/392, 366; 106/47 Q, 106/50; 350/96 M, 96.29, 96.34

[56] References Cited

U.S. PATENT DOCUMENTS

| | | | |
|---|---|---|---|
| 2,359,789 | 10/1944 | Pincus | 106/47 R |
| 2,381,925 | 8/1945 | Pincus | 106/47 R |
| 2,920,972 | 1/1960 | Godron | 106/47 R |
| 3,328,181 | 6/1967 | Weidel | 106/47 R |
| 3,746,556 | 7/1973 | Morgan | 106/47 R |
| 3,751,272 | 8/1973 | Izumitami et al. | 106/47 Q |
| 3,798,041 | 3/1974 | Izumitami et al. | 106/47 Q |
| 3,944,352 | 3/1976 | Morgan | 106/47 Q |
| 3,947,282 | 3/1976 | Kaes | 106/47 R |
| 3,999,836 | 12/1976 | Wolf | 106/50 |

*Primary Examiner*—O. R. Vertiz
*Assistant Examiner*—Mark Bell
*Attorney, Agent, or Firm*—David M. Keay

[57] ABSTRACT

Novel optical fibers are formed from glass compositions enclosed by the iso-composition lines, 2 and 18 mole percent $P_2O_5$, 30 and 70 mole percent $Al_2O_3$ and 20 and 60 mole percent $B_2O_3$ or glass compositions bounded by lines connecting the compositions 28 m% $Al_2O_3$ — 72 m% $P_2O_5$ — 0 m% $B_2O_3$; 5 m% $Al_2O_3$ — 45 m% $P_2O_5$ — 50 m% $B_2O_3$; 10 m% $Al_2O_3$ — 30 m% $P_2O_5$ — 60 m% $B_2O_3$ and 42 m% $Al_2O_3$ — 58 m% $P_2O_5$ — 0 m% $B_2O_3$. The glass compositions forming the optical fibers can contain the usual oxide modifiers.

7 Claims, No Drawings

OPTICAL FIBERS FORMED OF ALUMINUM BOROPHOSPHATE GLASS COMPOSITIONS

BACKGROUND OF THE INVENTION

This invention relates to novel optical fibers formed of aluminum borophosphate glass compositions. Optical fibers currently are undergoing intensive development as the transmission link in optical communication systems. Among the properties required of successful fibers are low optical attenuation, low optical dispersion, large numerical aperture and long service life. Present technology utilized two types of glass for optical fibers, simple silicates and complex silicates.

Simple two-component silicate glasses are made by vapor depositing highly purified raw materials onto mandrels which are subsequently heat treated to give fully densified preforms. Fibers are then pulled from the preforms at high temperatures. Refractive index profiles, either step or graded, are incorporated into the preforms by varying the composition of the gas mixture during vapor deposition. Glass compositions most commonly used are germanosilicate core/silica cladding or silica core/borosilicate cladding. These high silica fibers possess favorable properties, including low attenuation (due both to the high purity of the starting materials and to the deep UV cutoff of silica), satisfactory dispersion characteristics and good solarization resistance. However, the high melting temperatures of silica is a disadvantage of these materials. Temperatures on the order of 2,000° C. are required to pull fibers from the preforms. In addition, this high melting temperature restricts the preform preparation method to relatively low temperature techniques such as vapor deposition, since direct melting at 2,000° C. would lead to unacceptable impurity levels in the glass caused by excessive corrosion of the crucible materials. The careful control of temperature and deposition rates of materials is a second production difficulty of the high silica fibers. The complex nature of the co-deposition process limits the number of components which can be included in the glass composition, and in all practical cases to date, the limit has been three separate oxide components. This constraint affords little flexibility in adjusting the relevant physical properties of the glass, primarily refractive index, thermal expansion coefficient and viscosity-temperature relation. Since the refractive index profile is of greatest importance, the glass composition is generally adjusted to optimize that parameter and this precludes any substantial control of the other physical properties of the glass.

Optical fibers can also be manufactured from complex silicates. The processing involves preparing batch quantities of two glasses of distinct composition by standard glass melting methods, taking care to suppress the level of transition metal impurities. The glass are then remelted in a concentric, platinum double crucible and fibers are drawn directly from the melts through a bottom orifice. The melt from the central crucible gives rise to the core of the fiber while that in the annular crucible provides the cladding. Two variations are possible: if the fiber is cooled quickly, a step index fiber results; whereas if the fiber is maintained at a sufficiently elevated temperature, interdiffusion between the core and the cladding occurs and a graded index fiber is produced. The complex silicate glasses largely avoid the difficulties associated with high silica fibers. Specifically, they can be melted at temperatures low enough (approximately 1,500° C.) so that platinum crucibles can be used without introducing excessive impurity concentrations, and the multi-component nature of the glass composition provides adequate flexibility for independently adjusting the glass properties by altering the relative concentrations of the various components. However, complex silicates also have disadvantages for optical fiber applications. First, such glasses are known to be subject to solarization effects which could limit the operational lifetime of the fibers. Second, the relatively shallow UV cutoff of these glasses has two deleterious effects on their optical properties: it gives a relatively high residual (i.e., non-impurity related) absorption coefficient, and it leads to a relatively high optical dispersion, which is particularly undesirable for communications systems using broad-band emitters such as light emitting diodes for light sources.

It would be desirable to provide optical fibers formed of glass compositions having relatively low melting points so that the composition of the fiber can be controlled relatively easily. In addition, it would be desirable to provide optical fibers having good solarization resistance, low optical dispersion and good transparency to ultraviolet light. Furthermore, it would be desirable to provide optical fibers from glass compositions which have satisfactory index profiles while maintaining low internal mechanical stress.

SUMMARY OF THE INVENTION

This invention provides novel optical fibers formed from glass compositions enclosed by the iso-composition lines, 2 and 18 mole percent $P_2O_5$, 30 and 70 mole percent $Al_2O_3$ and 20 and 60 mole percent $B_2O_3$ or bounded by lines connecting the compositions 28 m% $Al_2O_3$ — 72 m% $P_2O_5$ — 0 m% $B_2O_3$; 5 m% $Al_2O_3$ — 45 m% $P_2O_5$ — 50 m% $B_2O_3$; 10 m% $Al_2O_3$ — 30 m% $P_2O_5$ — 60 m% $B_2O_3$ and 42 m% $Al_2O_3$ — 58 m% $P_2O_5$ — 0 m% $B_2O_3$. The glasses used to form the optical fibers can be modified, if desired, by the addition of a wide variety of oxides with the modifier levels allowable being dependent upon the specific modifier composition being added. Glasses in the aluminum borophosphate system are found to have good solarization resistance, low optical dispersion and good transparency for ultraviolet wavelengths (indicative of both low dispersion and low intrinsic absorption at optical wavelengths). These aluminum borophosphate glasses offer the advantage that fibers can be prepared by standard techniques, such as the double crucible method at relatively low temperatures. Moreover, these glasses offer the flexibility of independent variation of important material properties such as refractive index and thermal expansion coefficient. Finally, although other techniques may be used, certain of the aluminum borophosphate glasses seem particularly suited to the production of graded index fibers by a novel technique involving the preferential vaporization of volatile species from the glass surface disclosed in application Ser. No. 773,526, entitled "Method for Forming Optical Fibers" filed concurrently herewith by Richard M. Klein.

DESCRIPTION OF SPECIFIC EMBODIMENTS

The low phosphate aluminum borophosphate glasses utilized to form the optical fibers of this invention are formed in a manner so that vaporization of the glass forming constituents, particularly $P_2O_5$ is minimized and controlled. Materials which are sources of $Al_2O_3$, $B_2O_3$ and $P_2O_5$ are blended, calcined, if desired, and preferably melted in a crucible which does not dissolve in the glass composition or the precursor of the glass composition. Normal melting temperatures range between about 1,450° C. and 1,800° C., usually between about 1,500° C. and 1,650° C., depending upon the specific glass composition being formed. Normal seed-free firing time is between about 0.25 and 4.0 hours, preferably between about 1.0 and 2.0 hours. It is preferred to maintain minimum firing times in order to reduce vaporization of the glass-forming constituents. After substantially complete reaction of the reactants is obtained in the melt, it is cooled in any conventional manner.

Since $P_2O_5$ is the most volatile glass-forming constituent, it can be added in concentrations in excess of the desired final concentration in the glass composition. Alternatively and preferably, the $P_2O_5$ is added to the crucible in the form of a refractory compound such as $AlPO_4$, $BPO_4$, $AlP_3O_9$ or refractory modifying cation phosphates such as $Mg_2P_2O_7$, $Ca_3(PO_4)$, $ZrP_2O_7$ or the like. By adding $P_2O_5$ as a refractory compound, improved control of the final glass composition is attained.

As set forth above, the low phosphate glass compositions contain from 2 to 18 mole percent $P_2O_5$, from 30 to 70 mole percent $Al_2O_3$ and from 20 to 60 mole percent $B_2O_3$. In addition, the ternary glass composition can contain oxide modifiers including $SiO_2$, MgO, CaO, $TiO_2$, $ZrO_2$, $Na_2O$, CdO, ZnO, $SnO_2$, $CeO_2$ and the like. Silica in concentrations up to about 40 mole percent provides increased resistance to devitrification of the aluminum borophosphate glasses while MgO expands the glass-forming region. In a similar way other specific modifiers or combinations of modifiers can be used to effect other changes in glass properties.

Representative sources of $P_2O_5$ are $AlPO_4$, $BPO_4$, $AlP_3O_9$ or refractory modifying cation sources such as $Mg_2P_2O_7$, $Ca_3(PO_4)_2$ or $ZrP_2O_7$. Representative sources of $Al_2O_3$ are $Al_2O_3$, $AlPO_4$, $AlP_3O_9$ and modifying cation aluminates such as $MgAl_2O_4$. Representative sources of $B_2O_3$ are $BPO_4$, $B_2O_3$ or modifying cation borates such as $Mg_3B_2O_6$.

The low phosphate glass compositions utilized in the optical fibers of this invention are stable against degradation by water as are the conventional multicomponent soda-lime silicate glasses even though both $B_2O_3$ and $P_2O_5$ in their pure state are strongly deliquescent. In addition to those properties of the low phosphate aluminum borophosphate glasses which are broadly similar to conventional silicate materials, there are other properties of the new glasses which are unusual. Their optical properties are particularly significant. Refractive index ranges between 1.47 and 1.58, with optical dispersion, given as the $v$-value, between 48 and 71 (where a high $v$-value represents a low optical dispersion). Because most silicates have higher refractive indices and smaller $v$-value (i.e., higher dispersions), the ranges for these two parameters place the new glasses in an advantageous position for optical applications. Provided that special preparation techniques are used to ensure that low impurity levels are maintained, the ultraviolet cutoff of certain compositions in the aluminum borophosphate system occurs at about 190 nm, which approaches that of fused silica. Thus, the low phosphate glasses are more transparent at ultraviolet wavelengths than any conventional glasses except fused silica. This feature, coupled with their good solarization resistance, makes them particularly favorable for optical fiber applications. The low phosphate aluminum borophosphate glasses also show unusual capabilities for independent property control. For instance, the iso-property contour lines for refractive index and thermal expansion coefficient are not parallel in a large area of the low phosphate glass-forming region. This means, for example, that refractive index can be adjusted while retaining a constant thermal expansion coefficient, which is a particularly favorable feature for applications such as optical fibers. The low phosphate glasses utilized in this invention have refractive indices between 1.47 and 1.58, densities between 2.1 and 2.7 $gm/cm^3$ and thermal expansion coefficients between about 26 and $55 \times 10^{-7}/°C$.

The high phosphate aluminum borophosphate glasses used to form the optical fiber of this invention also can be prepared in the manner set forth above for the low phosphate glasses. In addition, the high phosphate aluminum borophosphate glasses can contain the same oxide modifiers as set forth above for the low phosphate glasses. Most high phosphate glasses also are stable against degradation by water. Refractive index ranges between 1.49 and 1.53, decreasing with decreasing $P_2O_5$ content. Optical dispersion, given as $v$-value ranges between 50 and 74. The ultraviolet cutoff occurs at below about 200 nm and the glasses can exhibit good solarization resistance. In addition, like the low phosphate glasses, extensive portions of the glass-forming region in the high phosphate aluminum borophosphate system offer flexibility for independently adjusting the important material properties. For example, the contours corresponding to constant values of the thermal expansion coefficient and refractive index are not parallel in large parts of the high phosphate glass-forming region. Hence, fibers produced from glasses in this zone of compositions can have a gradient in refractive index across their diameters while retaining the favorable mechanical properties inherent in a constant thermal expansion coefficient.

Both the low and high phosphate aluminum borophosphate glasses described above are utilized to form optical fibers having a composition on and near its surface with a refractive index lower than the refractive index of the glass composition forming the interior of the fiber. The difference between the refractive index of the cladding and the core is at least about 0.007, preferably greater than 0.015. Generally, the optical fibers have a core diameter between about 45 and 85 $\mu m$ or can be larger or smaller. The cladding has a thickness between about 30 and 60 $\mu m$ although this can also vary. The optical fibers can be formed from the low phosphate glass, the high phosphate glass or a combination of the low and high phosphate glasses wherein the cladding or core can be either the high phosphate glass or the low phosphate glass.

The optical fibers of this invention can be produced by conventional optical fiber-making techniques such as vapor deposition techniques and by the double crucible method; in addition, fibers from the high phosphate glasses can be prepared by the selective vaporization method described and claimed in application Ser. No. 773,526, entitled "Method of Making Optical Fibers" filed in the name of Richard M. Klein. In vapor deposition techniques, a vapor phase reaction is used to deposit materials of varying refractive index onto a mandrel. During deposition, the concentrations of the individual materials are varied so as to produce the composition gradient required for the desired index profile. After deposition, the preform produced is thermally sintered and collapsed, and then drawn into a fiber. The sintering, collapsing and drawing are controlled so that no unanticipated changes occur in the gradient. Since the deposited materials are co-deposited, they must be compatible with a single set of deposition condition so that the deposition technique is limited to two-component systems.

In the double crucible method, bulk glasses first are prepared which glasses have compositions suitable for use as the core/cladding end members. These glasses then are remelted and fibers are pulled from concentric double platinum crucibles. The combined glass stream commonly is maintained at a high temperature to permit interdiffusion between the core and cladding in order to provide a graded refractive index profile. Since the index gradient is formed during fiber pulling, simultaneous control is maintained for both the fiber drawing process and the interdiffusion process.

In the copending application referred to above and incorporated herein by reference, there are described processes involving the selective vaporization of a composition which forms the surface of the optical fiber; this vaporization method is applicable to high phosphate glasses. The cladding is formed by heating the glass composition to selectively vaporize volatile $P_2O_5$, thereby to reduce the refractive index at the fiber surface. In general, the temperature is chosen high enough (usually above the glass transition temperature) so that the vaporization process is not unduly long. However, the temperature and time of heat treatment must be chosen such that crystallization and phase separation, which may occur for specific compositions, are avoided. Moreover, for those embodiments which involve heating preforms or fibers, the time and temperature utilized should not cause undesirable deformation due to viscous flow. Typical vaporization temperatures when treating the fibers or preforms are between about 500° C. and 800° C. The vaporization step can be conducted in a vacuum in order to increase the rate of $P_2O_5$ vaporization. In one embodiment, the optical fiber is made by first forming a preform of the optical fiber, then heat treating the preform to establish the refractive index gradient and drawing the preform to make the fiber. The preform can be made by casting or pulling or other suitable techniques. After the preform is heat treated, the fiber is drawn at high temperature, under conditions to assure that the portion of the preform deficient of $P_2O_5$ forms the cladding of the optical fiber and the portion of the preform which retains the $P_2O_5$ after heat treatment forms the core of the optical fiber.

In another aspect of the process for forming the optical fibers, the components of the glass composition are melted to form the glass. The fiber then is drawn from the melt and while being drawn, is heat treated to effect selective vaporization of $P_2O_5$ under the conditions set forth above. This technique also can be utilized by first forming a preform, drawing the optical fiber from the preform and heat treating the fiber while it is being drawn. An alternative process comprises forming a fiber by drawing it from the glass melt or preform. Thereafter, the fiber is heat treated to vaporize $P_2O_5$ from its surface under the conditions set forth above. In another aspect of this invention, the surface of the melt can be heated to effect selective vaporization of $P_2O_5$ at the melt surface while the composition in the body of the melt remains intact. The fiber then is drawn from the melt so that the cladding of the fiber is formed from the composition at the melt surface and the core of the fiber is formed from the composition in the body of the melt.

The procedures given below were used to prepare glasses of improved purity for UV absorption measurements. Although these procedures were not generally used to prepare glasses, they do not constitute a substantive change in preparation technique since in each case, prior to melting, one has an intimate mixture of the preferred starting oxides.

EXAMPLE I 55.2 ml of 1.245 M $Al(NO_3)_3$ solution (made from $Al(NO_3)_3 \cdot X H_2O$ with less than 10 ppm cation impurities) was mixed with 13.0 ml of 15.05 M $H_3PO_4$ (with less than 50 ppm cation impurities). The mixture was heated to about 90° C. while stirring. After about 3.5 hours, the remaining solution was transferred to an $Al_2O_3$ crucible and then heated slowly to 700° C. (25° C./h to about 200° C., 60° C./h to 440° C. and 120C/h to 700° C.) and maintained at that temperature for 80 min.

The resultant mixture was fired in the $Al_2O_3$ crucible at 1,425° C. for 1 hour. The melt was then poured into a preheated graphite mold and annealed using standard techniques.

EXAMPLE II 15.5 ml of 15.05 M $H_3PO_4$ was diluted with about 150 ml of $H_2O$. The solution was heated to about 100° C. while stirring and 6.147 g $Al(OH)_3$ and 3.549 g $H_3BO_3$ (less than 5 ppm cation impurities) was added. After about 4 hours, the suspension was transferred to an $Al_2O_3$ crucible which was then heated slowly to 700° C. (See preceding example for heating schedule).

The resultant mixture was fired at 1,500° C. for 2 hours. The melt was quenched between steel plates, then annealed using standard techniques.

EXAMPLE III 115.0 ml of 1.245 M $Al(NO_3)_3$ solution was heated slowly to about 400° C. to drive off $H_2O$ and $NO_2$. After cooling to room temperature, about 150 ml of $H_2O$ and 4.0 ml of 15.05 M $H_3PO_4$ were added. The suspension was heated to about 90° C. while stirring and 9.056 g $H_3BO_3$ was added. After 6 hours, the suspension was transferred to an $Al_2O_3$ crucible which was then heated slowly to 700° C. using the previously described schedule. After cooling to room temperature, the resultant material was removed from the crucible, mixed and then returned to the $Al_2O_3$ crucible.

The resultant mixture was fired at 1620° C. for 2 hours. The melt was quenched between steel plates and then annealed using standard techniques.

The properties of the compositions produced by the processes described in the examples which are relevant herein are given below:

| | Example I | Example II | Example III |
|---|---|---|---|
| Wavelength (nm) at which a 0.5 mm thickness would transmit 50% of the incident radiation (neglecting reflection) | 188 | 194 | 210 |
| Refractive Index ($n_d$) | 1.522 | 1.507 | 1.526 |
| Optical Dispersion (ν-number) | 64 | 67 | 58 |
| Thermal Expansion Coefficient ($10^{-7}$/° C) | 60 | 52 | 34 |

|  | Example I | Example II | Example III |
|---|---|---|---|
| 25° C – 450° C |  |  |  |

We claim:
1. An optical fiber comprising:
   a core having a refractive index of between 1.47 and 1.58 and formed from a glass composition selected from the group consisting of:
   a. a high phosphate glass of a composition lying within the region of a ternary $Al_2O_3$-$P_2O_5$-$B_2O_3$ composition diagram wherein said region is bounded by lines connecting the compositions 28 mole percent $Al_2O_3$-72 mole percent $P_2O_5$-0 mole percent $B_2O_3$; 5 mole percent $Al_2O_3$-45 mole percent $P_2O_5$-50 mole percent $B_2O_3$; 10 mole percent $Al_2O_3$-30 mole percent $P_2O_5$-60 mole percent $B_2O_3$; and 42 mole percent $Al_2O_3$-58 mole percent $P_2O_5$-0 mole percent $B_2O_3$, and
   b. a low phosphate glass of a composition lying within the region of a ternary $Al_2O_3$-$P_2O_5$-$B_2O_3$ composition diagram wherein said region is bounded by the isocomposition lines 2 and 18 mole percent $P_2O_5$, 30 and 70 mole percent $Al_2O_3$, and 20 and 60 mole percent $B_2O_3$; and
   a cladding formed from a glass composition selected from the group consisting of said high phosphate glass and said low phosphate glass and having a refractive index at least 0.007 less than that of the central portion of the core.

2. The optical fiber of claim 1 having a core formed of said high phosphate glass composition.

3. The optical fiber of claim 1 having a core formed of said low phosphate glass composition.

4. The optical fiber of claim 1 wherein the core is formed from said high phosphate glass and the cladding is formed from said low phosphate glass.

5. The optical fiber of claim 1 wherein the core is formed from said low phosphate glass and the cladding is formed from said high phosphate glass.

6. An optical fiber comprising:
   a core having a refractive index of between 1.47 and 1.58 and formed from a material selected from the group consisting of:
   a. a mixture of a high phosphate glass of a composition lying within the region of a ternary $Al_2O_3$-$P_2O_5$-$B_2O_3$ composition diagram wherein said region is bounded by lines connecting the compositions 28 mole percent $Al_2O_3$-72 mole percent $P_2O_5$-0 mole percent $B_2O_3$; 5 mole percent $Al_2O_3$-45 mole percent $P_2O_5$-50 mole percent $B_2O_3$; 10 mole percent $Al_2O_3$-30 mole percent $P_2O_5$-60 mole percent $B_2O_3$; 42 mole percent $Al_2O_3$-58 mole percent $P_2O_5$- 0 mole percent $B_2O_3$; and an oxide modifier; and
   b. a mixture of a low phosphate glass of a composition lying within the region of a ternary $Al_2O_3$-$P_2O_5$-$B_2O_3$ composition diagram wherein said region is bounded by the isocomposition lines 2 and 18 mole percent $P_2O_5$, 30 and 70 mole percent $Al_2O_3$, 20 and 60 mole percent $B_2O_3$; and an oxide modifier,
   said oxide modifier selected from the group consisting of $SiO_2$, $MgO$, $CaO$, $TiO_2$, $ZrO_2$, $Na_2O$, $CdO$, $ZnO$, $SnO_2$, and $CeO_2$, present in an amount less than 40 mole percent; and
   a cladding formed from a glass composition selected from the group consisting of said high phosphate glass and said low phosphate glass having a refractive index at least 0.007 less than that of the central portion of the core.

7. An optical fiber comprising:
   a core having a refractive index of between 1.47 and 1.58 and formed from a glass composition selected from the group consisting of:
   a. a high phosphate glass of a composition lying within the region of a ternary $Al_2O_3$-$P_2O_5$-$B_2O_3$ composition diagram wherein said region is bounded by lines connecting the compositions 28 mole percent $Al_2O_3$-72 mole percent $P_2O_5$-0 mole percent $B_2O_3$; 5 mole percent $Al_2O_3$-45 mole percent $P_2O_5$-50 mole percent $B_2O_3$; 10 mole percent $Al_2O_3$-30 mole percent $P_2O_5$-60 mole percent $B_2O_3$; and 42 mole percent $Al_2O_3$-58 mole percent $P_2O_5$-0 mole percent $B_2O_3$; and
   b. a low phosphate glass of a composition lying within the region of a ternary $Al_2O_3$-$P_2O_5$-$B_2O_3$ composition diagram wherein said region is bounded by the isocomposition lines 2 and 18 mole percent $P_2O_5$, 30 and 70 mole percent $Al_2O_3$, and 20 and 60 mole percent $B_2O_3$; and
   a cladding formed from a material selected from the group consisting of a mixture of said high phosphate glass and an oxide modifier, a mixture of said low phosphate glass and an oxide modifier, said oxide modifier selected from the group consisting of $SiO_2$, $MgO$, $CaO$, $TiO_2$, $ZrO_2$, $Na_2O$, $CdO$, $ZnO$, $SnO_2$ and $CeO_2$, present in an amount less than 40 mole percent.

* * * * *